United States Patent [19]
Grossman et al.

[11] Patent Number: 5,076,678
[45] Date of Patent: Dec. 31, 1991

[54] LASER DIODE LIGHT IMAGING OPTICS

[75] Inventors: William M. Grossman; Richard W. Wallace, both of Los Altos; Leonard Pearson, Sunnyvale; Martin A. Gifford, Palo Alto, all of Calif.

[73] Assignee: Lightwave Electronics Corporation, Mountain View, Calif.

[21] Appl. No.: 343,469

[22] Filed: Apr. 25, 1989

[51] Int. Cl.$^5$ .................................................. G02B 3/06
[52] U.S. Cl. .................................... 359/710; 359/664
[58] Field of Search ................................ 350/433, 416

[56] References Cited
U.S. PATENT DOCUMENTS

4,500,200 2/1985 Kleinhans ........................... 350/433
4,712,207 12/1987 Reno .................................. 369/112

Primary Examiner—Bruce Y. Arnold
Assistant Examiner—Rebecca D. Gass
Attorney, Agent, or Firm—Rosenblum, Parish & Bacigalupi

[57] ABSTRACT

A diode imaging system using a single objective lens and a single cylindrical lens. This imaging system does not image perfectly point-to-point, and although not an apparent extension of imaging systems known in the prior art, it works advantageously for imaging beams from diode lasers having long narrow junctions used in pumping solid-state lasers.

17 Claims, 5 Drawing Sheets

LASER DIODE LIGHT IMAGING OPTICS

This invention was made with U.S. government support under contract DNA001-86-C-0239 awarded by the Defense Nuclear Agency. The government has certain rights in this invention.

BACKGROUND OF THE INVENTION

1. Field of the Invention

The present invention relates generally to optical imaging systems, and more specifically to systems for imaging non-circular beams of light received from laser diodes into more circular areas of surfaces on of solid-state laser materials or optical fibers.

Figure 1E:
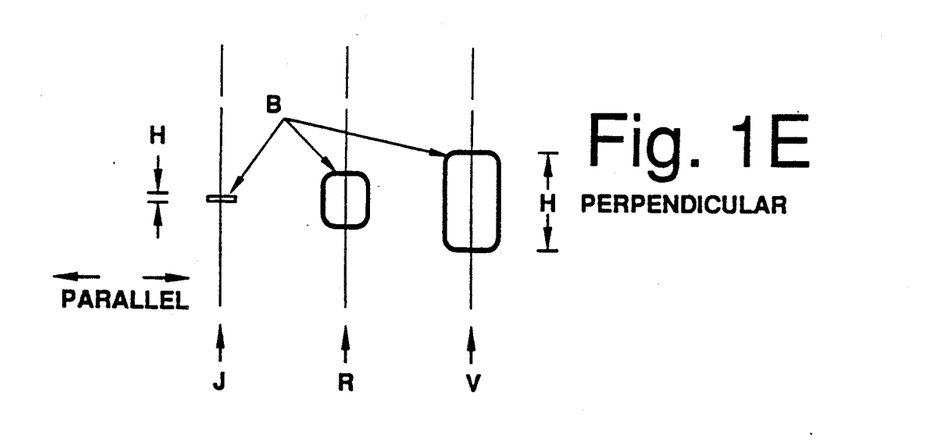
FIGS. 1T, 1S and 1E are schematic top, side and end views respectively of a typical laser diode emitting a noncircularly symmetric beam of light which deforms from the semi-elliptical horizontal shape through the more circular shape to the semi-elliptical vertical shape.

Laser diodes emit light in beams diverging nonsymmetrically. As FIG. 1T, shows in a top view normal to optical axis OA a typical laser diode 10 PN junction J emitting region has a width W, which coincides with the major axis of elliptical beam B, between 5 and 200 um wide and possibly up to 1 cm wide. Laser diodes 10 over 10 um wide typically emit light that is spatially incoherent across the width of the diode. The emitted light is polarized and diverges typically between 8 and 15 degrees in the "parallel" dimension, i.e., the direction of arrow 11 parallel to width W in FIG. 1T and parallel to plane 12 of PN junction J as seen in side view FIG. 1S.

Figure 1S:
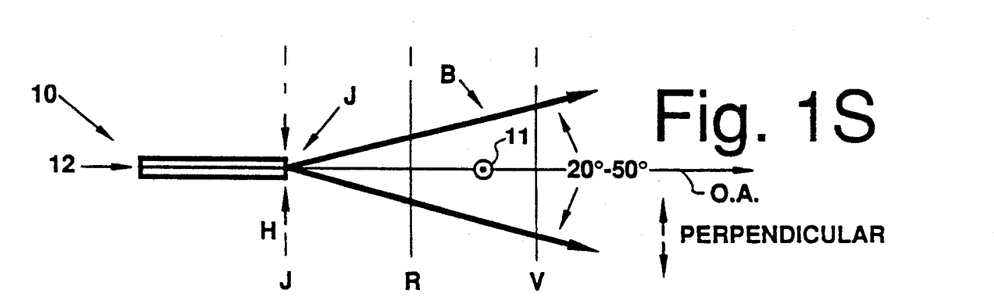
Figure 1T:
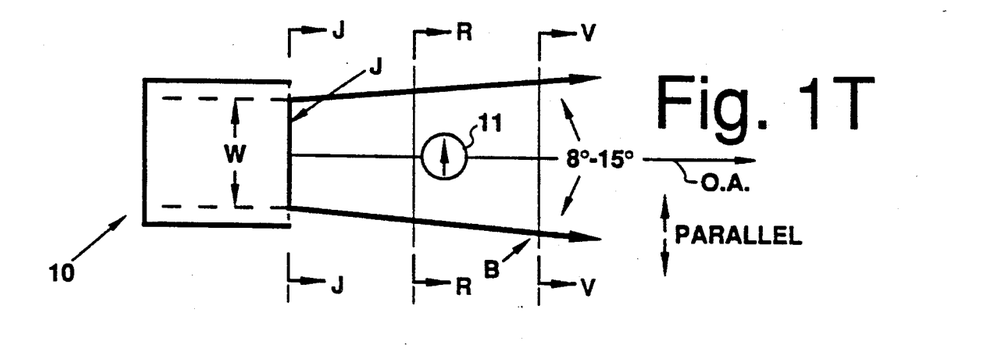

As shown in FIG. 1S, such a laser diode PN junction J has a height H which is much shorter, typically between 0.5 and 2 um high, in the "perpendicular" dimension, i.e., the dimension perpendicular to PN junction J plane 12. In the perpendicular dimension, laser diode 10 is a diffraction-limited source of spatially coherent light diverging typically 2 to 6 times more rapidly than in the parallel dimension. At half-maximum of light intensity, full angles are in a range between 20 and 50 degrees in the perpendicular dimension. FIG. 1E is an end-view of the beam seen in areas of sections across the FIG. 1T and 1A OA at corresponding lengths. Hence, in the faster diverging perpendicular dimension of light from diode junction J, the intially shorter height H overtakes width W and makes the beam more circular at a distance R. Afterwards, height H becomes the major axis of vertically semi-elliptical beam B.

Figure 2E:
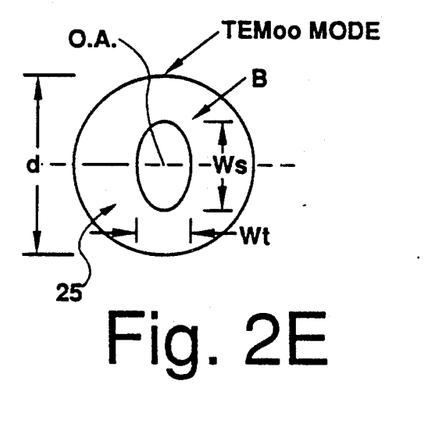
FIGS. 2E and 2S are respectively end and side cross-sectional views of a semi-elliptical diode beam focused to a "waist"
Figure 2S:
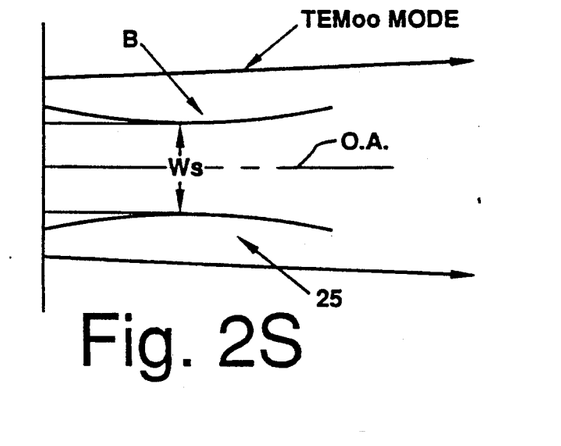

A laser diode pumped laser, to operate efficiently in the fundamental transverse spatial mode ($TEM_{00}$), needs to have a circularly cylindrical $TEM_{00}$ mode volume diameter large enough to encompass the beam of light pumped from a laser diode 10 as shown in FIG. 2S. If, for example contrary to FIGS. 2, diode 10 pumps some of its light into regions of gain material outlying the circular $TEM_{00}$ mode volume, then, while the laser is below the threshold for lasing in higher order modes, the energy pumped into those outlying regions is lost through fluorescence and heat without practical benefit.

It is possible for semi-elliptical beams of light to be re-shaped into rounder beams. However, it is also important that laser diode 10 pump beam light energy be focused into a circularly cylindrical volume with the smallest diameter attainable, in order to be most efficiently absorbed and converted into power in a solid-state laser. Minimizing a laser's pumped gain region 25 diameter maximizes its gain. Increased gain permits increased output-coupling, which in turn more efficiently dominates fixed losses of the cavity, and also permits approximately inversely proportionately shorter pulses.

For any particular optical beam from a given source has an invariant product of the near-field spot size (diameter) times the sine of the far-field divergence angle times the refractive index of the media through which the beam is passing. Beams B, as shown in FIGS. 2E and 2S, are focused to "waists" Ws, Wt for diode-pumping solid-state lasers. If the beams are focused to diameters which are smaller than optimal then the beams diverge too widely before the beam is absorbed. The length over which all but 1/e of the pump light energy in the beam is absorbed is termed "the absorption length." Consequently, over-focusing, undesirably increases the diameter of the pump beam along its absorption length. Conversely, weaker focusing for reduced divergence is accompanied by increased waist diameters. Optical beams can practically only avoid excessive divergences through being magnified to larger waist diameters. Hence, to optimize end-pumped laser gain and performance, laser diode pump beam diameters are ultimately traded-off against their divergences, in a compromise which images pumping light beams into non-circularly cylindrical volumes of laser materials.

To maximize laser gain, diode pump beam diameter-multiplied-by-sine (divergence) products should be minimized in both the parallel and perpendicular dimensions. Generally, the sizes of diode pump beam B images should be magnified to reduce their far-field divergences in the perpendicular dimension, while being less magnified or demagnified, to reduce their diameters in the parallel dimension. In practice, diode pump beam-reshaping is usually emphasized in the less-easily focused parallel dimension, in which, although the divergence is less, the near-field diameter is much greater and when multiplied by the sine of the far-field divergence gives a greater product than in the perpendicular dimension.

Diode Transfer Optics Prior Art

Figure 3:
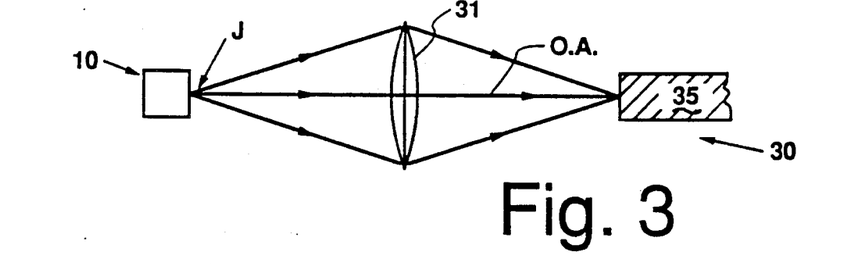
FIG. 3 is equally a top or a side view of a conventional single-objective imaging system.

FIG. 3 shows a conventional optical imaging system 30 using one single or multiple lens objective 31. One objective 31 is non-optimal for imaging diode pump light, but is often used (not shown) for coupling multi-mode optical fiber light into a laser material 35, or for coupling single transverse mode diode light either into a single transverse mode optical fiber or into a laser material 35.

Figure 4S:
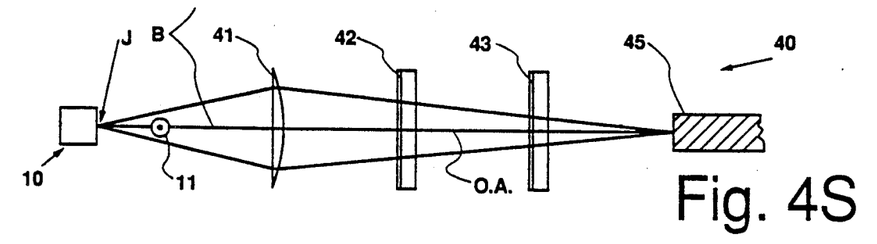
FIGS. 4T and 4S are top and side views respectively of a conventional three element imaging system.
Figure 4T:
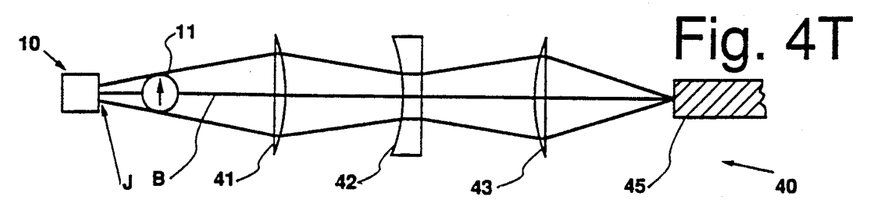

FIGS. 4T and 4S show a conventional imaging system 40 using an objective lens 41 followed by a negative cylindrical lens 42 in turn followed by a positive typically plano-convex cylindrical lens 43. Objective 41 magnifies the beam image in both dimensions, but more importantly reduces its especially steep divergence in the perpendicular dimension as shown in the side view of FIG. 4S. Cylindrical lenses have no power to focus in one dimension (in this orientation, the perpendicular dimension). In the parallel dimension as shown in FIG. 4T, lenses 41, 42, and 43 in combination magnify less than does objective lens 41 by itself in the perpendicular dimension. Standard lens imaging equations can be used to determine proper lenses and their powers so that the beam waists Ws and Wt in the two dimensions nearly coincide. With nearly equal focal lengths, positive cylindrical lens 43 and objective lens 41 can be symmetrically spaced about negative cylindrical lens 42 so that points on diode 10 are imaged one-to-one to points in laser cavity gain material 45.

Figure 5S:
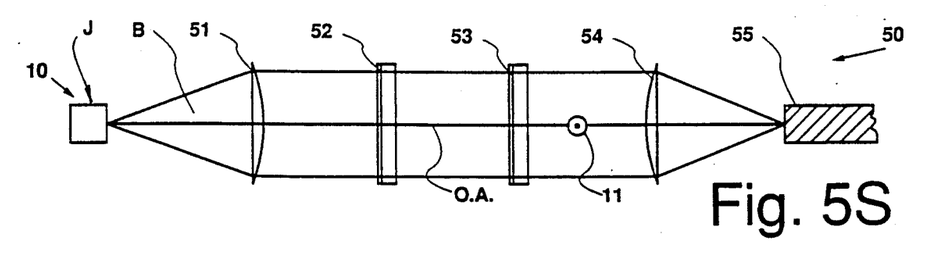
FIGS. 5T and 5S are top and side views respectively of a conventional four-element imaging system.
Figure 5T:
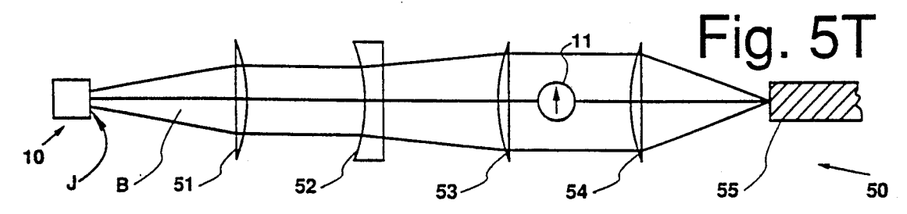

FIGS. 5T and 5S show a four-lens imaging system 50 conventionally used for pumping diode light into optical fibers 55 which are in turn coupled to solid-state lasers. First circularly symmetrical objective lens 51 has a numerical aperture (NA) not quite large enough for imaging, and only collimates beam B. The negative cylindrical lens 52 and positive cylindrical lens 53 do not focus, and only reshape the beam. The following second circularly symmetrical lens 54 focuses the beam down to a waist in gain material 55.

Either negative cylindrical lens 42 in FIGS. 4 or lens 52 in FIGS. 5 can be replaced by substitution of a second positive cylindrical lens in an imaging system (not shown) which produces a real, one-dimensional image between the two positive cylindrical lenses. This cylindrical lens substitution typically lengthens the optical train of the system and may require minor refocusing of objective 41 or 51. Still, double-positive cylindrical lens systems focus beams similarly to positive and negative cylindrical lens systems having equivalent NAs.

A conventional imaging system as described in the *Melles Griot Optics Guide* 3 pg. 376 uses three sophisticated optical elements: an anamorphic prism pair and an objective lens. The anamorphic prism pair shifts the optical axis, which may hinder optical alignment during manufacture of a diode pumped laser.

The above-described prior art beam imaging systems have reflective counterparts which are not discussed here. Conventional diode light imaging systems generally have the drawbacks either of sacrificing the shape of pump beams or else of employing three, four or more lenses or other optical elements each of which increases the length, complexity and/or cost of the imaging system.

SUMMARY OF THE INVENTION

Compared to multi-element imaging systems as described above, the present invention simplifies diode light imaging by using just one objective lens and one cylindrical lens. The objective lens focuses light in a beam towards the cylindrical lens, which then in the parallel dimension demagnifies the beam to make its waist cross-section more circular. Since focal properties in the parallel dimension are affected by the cylindrical lens, astigmatism is introduced. This astigmatism has previously disqualified two-lens systems from consideration for diode-imaging. Yet, as it happens according to the invention a semi-elliptical beam waist which is not refocused in the perpendicular dimension has a large enough depth of focus that, despite this astigmatism, the minimum beam diameter regions overlap in the two orthogonal dimensions. Two-lens imaging by the present invention is superior for diode-pumping of lasers compared to conventional single-lens systems, and rivals more complex multiple-lens imaging systems as described above. The two-lens geometry of the invention facilitates end-pumping of, for example, Q-switched solid-state lasers, non-planar uni-directional monolithic ring lasers, and CW solid-state laser materials.

DETAILED DESCRIPTION OF THE INVENTION

Figure 6:
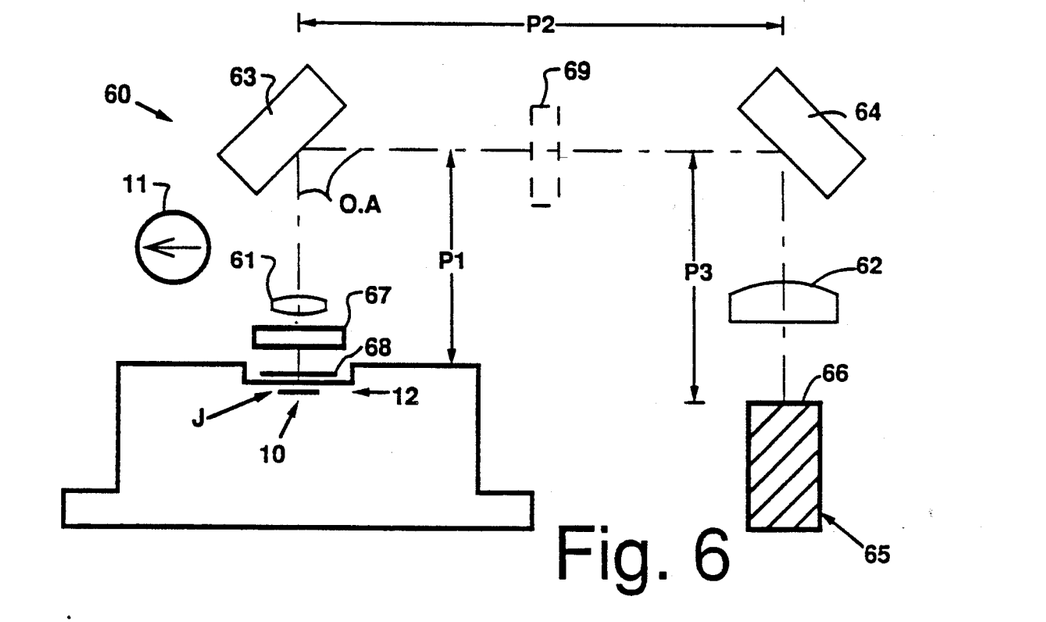
FIG. 6 is a schematic top view of a preferred embodiment of the present invention.

Laser diodes 10 are optically imaged by the present invention using just two focusing elements, an objective lens and a cylindrical lens for end-pumping solid-state gain materials independently of laser cavity mirror configurations. A solid-state gain material 65 as shown in FIG. 6 is end-pumped through a back-mirror which transmits light at the wavelength of the laser diode pump and reflects light at the wavelength of the laser cavity. The back-mirror may be either a coating on end surface 66 of gain material 65 or a separate substrate. If the back-mirror is separate, laser gain material end surface 66 should be Brewster-angled or coated so as not to reflect light of either the diode or laser wavelengths.

The two-lens imaging geometry of the invention is shown in FIG. 6 in an embodiment in which laser diode junction J pumps light in a beam 13 diverging nonsymmetrically along optical axis OA towards objective lens 61. Objective lens 61 directs and focuses the pump beam along axis OA to flat turning mirror 63, which reflects the beam onto flat mirror 64. In turn, mirror 64 reflects axis OA towards cylindrical lens 62. Mirrors 63 and 64 facilitate aligning the beam, but do not alter the fundamental two-element imaging properties of this invention. The invention is therefore more simply described with reference to FIGS. 7T and 7S system 70, which includes objective lens 71 and cylindrical lens 72, but which omits mirrors 63 and 64 as symbolized by their dashed outlines. The present invention also has a counterpart which uses reflective imaging by mirrors instead of transmissive imaging by lenses, but follows the same design principles.

Figure 7S:
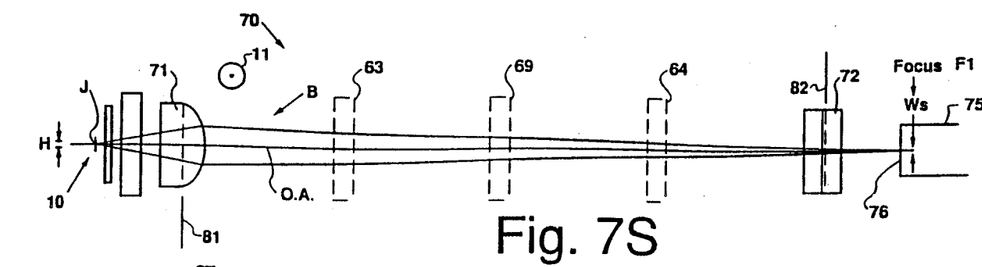
FIGS. 7T and 7S are, respectively, simplified schematic top and side cross-sectional views of optics and ray tracings according to the present invention.

Objective lens 71 has an NA high enough to efficiently collect light diverging from junction J of diode 10. Narrower or wider divergence beams B require proportionally lower or higher NA objectives. Objective lens 71 magnifies beam B to reduce its divergence, especially its steep 20 degree to 50 degree divergence in the perpendicular dimension as seen in FIG. 7S. Using moderately good (within three times diffraction-limited for a NA=0.45) lenses 71 and 72, optimization of focus is less critical or limiting in the perpendicular dimension. The height H of junction J is typically 50 to 200 times less than its width W before magnification, so the perpendicular image size is generally overwhelmed by the parallel image size. Diminishing benefits are returned from shrinking image sizes in either dimension, particularly the perpendicular dimension, while sizes remain large in the other dimension, or from imaging system precision higher than warranted by imaged diode 10 sizes.

Figure 7T:
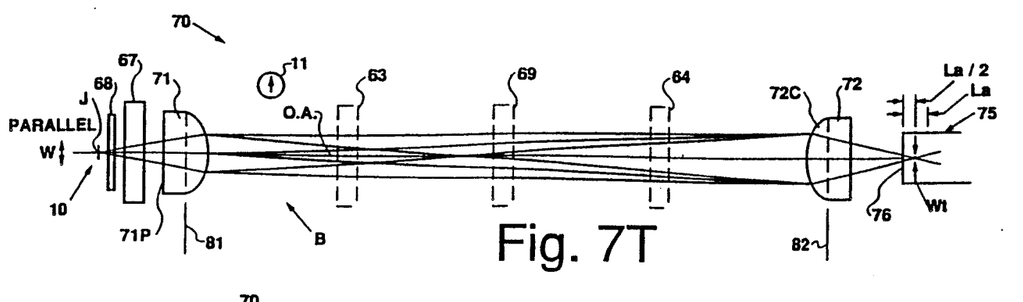
Figure 8:
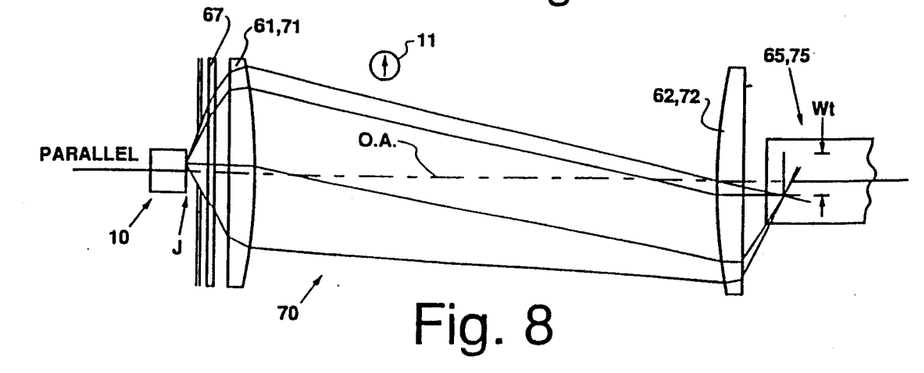
FIG. 8 is a not-to-scale enlargement of FIG. 7T.

Cylindrical lens 72 de-magnifies the beam image only in the parallel dimension as shown in the top view of FIG. 7T and in the enlarged top view of FIG. 8. In two-lens system 70 overall magnification in the parallel dimension is approximately one. Cylindrical lens 72 does not focus diode 10 perfectly point-to-point to laser gain material 75. However, cylindrical lens 72 can be positioned to focus the beam in the parallel dimension to an efficient minimum-size spot in a waist Wt having a depth of focus deep enough to overlap the depth of focus in the perpendicular dimension of beam B inside laser material 75. The "depth of focus" of the beam is the distance through which its radius remains less than the square root of 2 times the radius at the actual minimum waist W of the beam.

Preferably, end-pumped laser gain material 75 is at least several (e.g., 1 to 2) absorption lengths long to efficiently absorb energy from the beam pumped by diode 10. The pump beam diameter is preferably minimized at about one-half of its absorption length La inside face 76 through which beam B enters laser gain material 75.

Two optical-element imaging according to the invention is potentially advantageous for light pumping with laser diodes having junction widths W between, but not limited to, 25 and 1000 um and heights H between 0.3 and 10 um. (Actually, laser diodes having such a broad range of aperture sizes are not yet all commercially available.) The focusing power of cylindrical lens 72 optimally increases with increasing widths W of diodes having constant divergences in the parallel dimension. Cylindrical lens 72 optimal focusing expands with increasing (from say 8 up to 15 degree) divergences of diodes having constant widths N. Beam waist minimum diameters Wt can be tightened, and divergences correspondingly widened, in the parallel dimension by moving objective lens 71 closer to diode 10, which shifts the perpendicular dimension waist Ws at f1 away further from diode 10, and by simultaneously moving cylindrical lens 72 following f1 towards gain material 75, which further increases the distance between the lens' planes 81 and 82. Conversely, the spacing between diode junction J and lens 71 can be increased to focus less tightly in the parallel dimension.

Diffraction-limited optics, depending upon their magnification powers, geometrically image diode-pump sources 10 one um high into (FIG. 7S) waist diameters Ws in the perpendicular dimension of between 5 and 20 um high in laser material 75. Five to thirty-fold magnifications are preferred in the perpendicular dimension for diodes with 15 to 60 degree initial divergence in this dimension. For example, a diode 10 having a junction J one micrometer high pumping a beam with, at half-maximum intensity, a full-width divergence angle of 0.5 radians (28.6 degrees) requires about twenty-fold magnification to 20 um for pumping an Nd:YAG laser material 75 having a refractive index of 1.82 and an absorption length of 3 mm. Aberrations in practical optics tend to enlarge beam waist diameters, for example from 20 microns up to 50 microns, often making it desirable to focus more tightly. In this example cavity using Nd:YAG, magnification about twelve-fold is desirable and in the perpendicular dimension results in a beam having, at half-maximum intensity, a far-field full-angle of about 3 degrees and a depth of focus of 2 to 4 mm. Varying the diameter of the imaged pump beam waist in either dimension, and correspondingly oppositely varying its far-field divergence, by up to 20% affects only slightly the performance of the diode pumped solid-state lasers.

Preferred Embodiment

Imaging systems according to the present invention are preferably embodied compactly as shown in FIG. 6 by providing objective lens 61 or 71 (also see FIGS. 7T and 7S) with a short, approximately 1.5 to 5.0 mm, focal length. In a first embodiment, objective lens 61,71 is a plano-convex optical gradient index lens having a focal length of 3.6 mm and an NA of 0.45, known as a Selfoc Pickup Lens (SPL). "Selfoc" (R) is a registered trademark of Nippon Sheet Glass, Inc. Gradient index lenses more commonly have flat ends. Preferably, for minimum aberrations, objective 71 is oriented with its planar side 71P facing towards diode 10. An air spacing of 3 mm between diode junction J and the planar near face 71P of SPL lens 71 (or a spacing of 3.9 mm between junction J and principal plane 81 of SPL lens 71) results in diode 10 forming an inverted real image at a distance of about 59 mm away from junction J. In practice, the available objective SPL lens 61 incidentally happened to be compensated for aberrations in focusing onto compact discs, which do not form part of this invention. In compensation, as shown in FIG. 6 a corrector glass plate 67 one mm thick with a 1.5 refractive index was used, but is not critical to the invention. A cover glass window 68 0.2 to 0.3 mm thick with a non-unitary index of refraction and corrector plate 67 being interposed in the optical axis OA between diode 10 and SPL objective 61, 71 effectively increases by about 0.4 mm the actual spacing (4.3 mm) between diode facet J and principal plane 81 of SPL objective 61, 71. The invention in production embodiments preferably would, either by substituting a specifically appropriate objective lens 71, or by relaxing tolerances of aberrations in focusing, eliminate the need for, and omit, corrector plate 67.

Cylindrical lens 62,72 is preferably a plano-convex lens with a filled NA=0.2 and a focal length f2=6.35 mm and with anti-reflection coatings on both sides. Preferably, for minimum aberrations, cylindrical lens 62,72 is oriented with its principal plane 82 about 52.5 mm away from, and its convex side 72C facing, junction J of diode 10. Optical material in cylindrical lens 62,72, though without focusing power in one dimension, still has some finite index of refraction which affects image positions and alters the optimum position of objective 61,71.

The objective lens 71 spacing from junction J of diode 10 is crucial in determining the position of diode pump beam B in, and thus the performance of, laser gain material 65,75. The objective lens 61 spacing with respect to diode 10 must be long-term stable within about a ±2 um tolerance in both the perpendicular Y and parallel X dimensions, and stable within a ±4 um tolerance spacing in the Z focusing dimension along axis OA towards or away from diode 10. The objective 61 position is most readily adjustable during construction of the FIG. 6 folded imaging system.

Assembly

Figure 9:
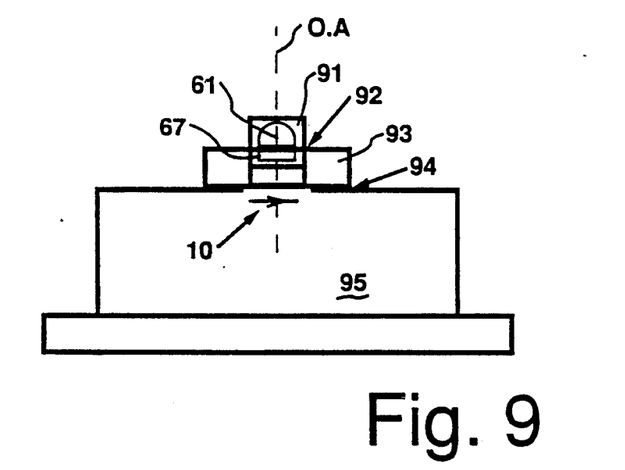
FIG. 9 is a detail view of the laser diode-and-objective lens assembly of FIG. 6.

The FIG. 6 imaging system embodiment 60 is preferably assembled in steps as follows with reference also to FIG. 9:

1) To focus on diode 10, objective lens 61 is held adjustably centered inside a metal tube or collet 91, along with a corrector plate 67 if necessary. Tube 91 is held by glue 92 encircled in a glass ring 93, the base of which is either mechanically locked or else buoyed on a film of liquified glue 94 on a diode package 95. During alignment, while being held in tube 91 objective lens 61 is preferably supported by a vacuum chuck mounted on a movable stage (not shown) having three degrees of translational freedom. Objective lens 61 could be aligned to diode 10 to optimize the performance of an end-pumped laser gain material 65 located as shown in FIG. 6. Alternatively, objective lens 61 is preferably and more simply aligned using a non-lasing target. Ring 93 positioning is optimized in the three orthogonal directions while the objective 61 image alignment and focus are observed on an overhead target (not shown). The target may be a screen or fluorescing laser material, in either case preferably observed by a television camera. Once objective lens holder 93 has been aligned properly, all the liquid glue 92 and 94 is simultaneously cured by exposure to UV light, and hardens to fix the position of ring 93 holding objective lens 61 with respect to diode package 95. This permanently and precisely centers and focuses the beam of light pumped from diode junction J to a first focal point f1 located about 59 mm away (FIG. 7S).

2) The spacing of the laser gain material 65 with respect to cylindrical lens 62 is not as critical as the spacing of the objective lens 61 with respect to the diode junction J. The gain material-to-cylinder lens spacing has a more relaxed ±0.5 mm tolerance of deviation from its optimum position for the laser to achieve over 95% of its maximum potential output power when being pumped at 3 times threshold power.

Some (e.g., Nd:YLF) crystalline laser materials 65 more efficiently absorb pump light polarized parallel to a particular crystalline axis. Nd:YLF preferentially absorbs light polarized in a plane parallel to its C-axis. In the FIG. 6 embodiment, the diode 10 polarization is preferably oriented with respect to laser crystal 65 for the highest absorption. For imaging system 60 to not be excessively aberrated, the lens 62 cylinder axis should be oriented within a ±1 degree tolerance of perpendicular to the arrow 11 direction of light polarization in plane 12 of junction J. In some applications it is desirable for laser crystal material 65 to be oriented differently, in part to rotate the polarization of the laser output beam. If it is inconvenient to change the diode mounting geometry or to reorient diode 10, then instead, if it is important to retain the polarization of the pump beam with respect to the laser material for good absorption, a half-wave plate 69 (FIGS. 6 and 7T and 7S) may be positioned to be intersected by pump beam axis OA preferably between objective lens 61 and cylindrical lens 62. Anti-reflection coated waveplates typically lose a negligible one-quarter of 1% of the power from the pump beam per surface.

The cylindrical lens 62 is mounted using, for example, glue cured by ultraviolet light, onto a subassembly structure (not shown) also holding laser gain material 65. The gain material 65 is placed with its near face 66 on the optical axis OA and spaced about 58 mm from junction J of laser diode 10.

3) The light from the assembly of diode 10 and objective lens 61 is focused and then guided by steering mirrors 63 and 64 into an area of end surface 66 of laser material 65, or optionally of an optical fiber (not shown). Mirrors 63 and 64 may be mounted mechanically or soldered onto supports (not shown) to facilitate aligning the pump beam in the two linear (X and Y, Table 1) dimensions and also in two angular dimensions. The path length of the optical axis OA is adjusted by moving mirrors 63,64 as a pair towards or away from both diode 10 and the laser material 65. The axis OA is angularly adjusted to be colinear with the axis of the solid-state laser material being pumped. Also, moving mirrors 63 and 64 in tandem to adjust the length of the optical path (p1+p2+p3) between cylindrical lens 26 and objective lens 61 enables bringing the pump beam minima in the two orthogonal dimensions nearly into coincidence. If objective lens 61 is not perfectly spaced from diode 10 the image will be displaced along the optical axis OA. This displacement, up to about +3 mm, can be compensated by moving as a unit the pair of turning mirrors 63 and 64 towards or away from diode 10. Experimentally, while keeping the focus of the pump beam waist relative to its optimum position anywhere within approximately +/− one-sixth of its absorption length, the pumped region's effective diameter and the peak power of a Nd:YAG laser vary no more than 10%. For example, the tolerance of the gain medium position along the optical axis is +/−0.5 mm for 1.1% doped Nd:YAG gain material being pumped by diode light centered at 808 nm and having a full spectral width of 3 mm and 10% intensity.

Diode pumped laser cavity 60 dimensions must be held within tolerances of about 10 um. The FIG. 6 optical 34 elements' approximate positional and angular stability tolerances with respect to laser diode 10, and to laser gain material 65, are given in the following Table 1:

|  | Stability Tolerances With Respect To Medium 65 Position | Stability Tolerances With Respect To Diode 10 Position | Placement Tolerances With Respect To Diode 10 Position |
|---|---|---|---|
| Diode 10 | p1 + p2 + p3 = 58 ± 2 mm | — | — |
| Corrector Plate 67 | — | x ± 1 mm | ±1 mm |
|  |  | y ± 1 mm | ±1 mm |
|  |  | z ± 20 um | ±20 um |
| SPL Objective Lens 61 | z ± 2 mm | x ± 2 um | ±.1 mm |
|  |  | y ± 2 um | ±.1 mm |
|  |  | z ± 4 um | ±10 um |
| First Turning Mirror 63 | — | x ± 5 um | ±1 mm |
|  |  | y ± 1 mm | ±1 mm |
|  |  | z ± 5 um | ±1 mm |
|  |  | θx ± .1 mr | ±.1 mr |
|  |  | θy ± .1 mr | ±.1 mr |
| Second Turning Mirror 64 |  | x ± 5 um | ±1 mm |
|  |  | y ± 1 mm | ±1 mm |
|  |  | z ± 5 um | ±1 mm |
|  |  | θx ± .1 mr | ±.2 mr |

|  | Stability Tolerances With Respect To Medium 65 Position | Stability Tolerances With Respect To Diode 10 Position | Placement Tolerances With Respect To Diode 10 Position |
| --- | --- | --- | --- |
| Cylindrical Lens 62 | x ± 1 mm | θy ± .1 mr | ±.2 mr |
|  | y ± 5 um | x ± 5 um | ±250 um |
|  | (p1 + p2 =) z ± 0.2 mm | y ± 1 mm | ±1 mm |
|  |  | z ± .5 mm | ±.5 mm |
| Position of Laser Resonator 65 | — | x ± 10 um | ±1 mm |
|  |  | y ± 10 um | ±1 mm |
|  |  | z ± 2 mm | ±2 mm |
| Angular Orientation of Laser Resonator 65 | — | x ± 2 mr | ±1 mr |
|  |  | y ± 2 mr | ±2 mr |

"—" means that the component in the row is not referenced to the component at the top of the column.
Top view x: parallel to junction J
Side view y: perpendicular to junction J
z: along optical axis OA For the FIG. 6 embodiment, the above-described spacing images almost optimally one-watt 160 um width junction Sony 303 diodes, 200 um width junction Sony 304 diodes, or 200 um width junction series 2460 Spectra-Diode Laboratory laser diodes when used for pumping laser gain materials of YAG, YLF or glass, doped with concentrations of between 0.5 and 2.0% of neodymium. Nd doping concentrations of 1.0 to 1.4% in YAG, or of 1.0 to 2.0% in YLF are preferred for best performance. Higher doping concentrations increase the absorption, but reduce both the optical quality and the fluorescence lifetime, of solid-state laser gain materials 65.

With the imaging system described in this invention, the imaged beam diameter can generally be made smaller in the perpendicular dimension than in the parallel dimension and the imaged beam is consequently not round. High-power pump beams imaged into noncircular areas can induce thermal lensing and thereby distort the output of a diode pumped laser (see chapter 7, *Solid State Laser Engineering* by W. Koechner, Springer Verlag N.Y., 1976). Pump beam shapes can be rounded through slight defocusing in the perpendicular dimension of the beam by moving mirrors 63 and 64 in tandem by 1 to 2 mm either towards or away from diode 10 and simultaneously laser material 65. This defocusing reduces slightly the gain and output power of the laser. Defocusing is necessary only in Nd:YAG gain materials with small size spots being pumped by very high power beams, or for gain materials 65 (e.g., Nd:glass) prone to thermal lensing.

Scaling

If the focal length of objective lens 61 is varied, then, by keeping both lenses' NAs fixed, the focal lengths, spacings, and positional tolerances of lenses 61 and 62 can all be simply geometrically scaled to obtain similar optical imaging systems. Imaging systems have also been demonstrated using the lenses of the preferred embodiment with spacings between the principal plane 81 of objective lens 61 and principal plane 82 of cylindrical lens 62 varied between 41 and 56 mm. Fpr the Sony 303 or 304, or for the Spectra-Diode Labs 2460-series, one-watt laser diodes, the preferred spacing is about 48 mm. If objective lens focal lengths f1 are too short (say below 0.5 mm for imaging a 200 um long diode stripe), the field of view required of the objective lens becomes excessive (over 20 degrees) and aberrations present difficulties. A suitably aberration-corrected objective lens 61 with a focal length as short as 1 mm should be satisfactory. Longer, such as 25 mm focal length objectives, in conjunction with proportionally longer focal length (44 mm) cylindrical lenses, would also be satisfactory There are higher costs for longer focal lengths in 0.45 NA objective lenses 61, as well as for wider aperture high-NA cylindrical lenses 62. Increasing the focal lengths of the two lenses provides longer working distances from cylindrical lens 62 to the laser material. Longer working distances between cylindrical lens 62 and the nearer surface 66 of laser material 65 can also be achieved economically and flexibly by placing between cylindrical lens 62 and laser crystal 65 a simple third lens (not shown) to image diode beam B into the mode volume of laser material 65. Addition of a third lens increases imaging system complexity but is still an economical way to lengthen working distances, and remains competitive with prior art systems using more optical elements such as systems including two cylindrical lenses.

While the present invention has been described in terms of a preferred embodiment, it will be appreciated by those skilled in the art that this embodiments may be modified without departing from the essence of the invention. It is therefore intended that the following claims be interpreted as covering any modifications falling within the true spirit and scope of the invention.

We claim:

1. Optical means for imaging light along an optical axis OA from a source beam having, orthogonal to said OA, more far-field divergence in a perpendicular dimension and a higher far-field divergence times near-field diameter product in a parallel dimension, into an image beam having less divergence in the perpendicular dimension than in the parallel dimension, comprising:

a circularly symmetrical objective lens positioned on OA and having a numerical aperture and field of view large enough to collect light from said source beam and to focus it through a waist Ws, and a positive cylindrical lens position on OA with its cylindrical axis aligned in said perpendicular dimension, and having a focal length short enough to focus light in said parallel dimension from said objective lens through a waist Wt deep enough to overlap said waist Ws.

2. Optical means as in claim 1 wherein said cylinder lens focuses light in said waist Wt to a focal point f2 within the depth of focus of said waist Ws.

3. Optical means as in claim 2 wherein said lenses focus light in said waists to respective focal points f1 and f2 within the depths of focus of each other.

4. Optical means as in claim 3 wherein said lenses focus light in said waists to respective focal points f1 and f2 coincident within 20% of the depths of focus of respective waists.

5. Optical means as in claim 1 wherein said objective lens will collect and focus light from a source beam diverging at least 20 degrees.

6. An imaging system as recited in claim 1 wherein said objective numerical aperture is at least 0.40.

7. An imaging system as recited in claim 6 wherein both said lenses are within three-times diffraction-limited.

8. An imaging system as recited in claim 6 wherein said objective lens has a focal length in the range between 1.5 and 5.0 millimeters.

9. An imaging system as recited in claim 8 wherein said objective lens focal length is 3.6 millimeters, and said cylindrical lens focal length is 6.35 millimeters, within ranges of 10%.

10. An imaging system as recited in claim 1 and further comprising respective mounting means for holding said lenses at an adjustable separation along said optical axis.

11. An imaging system as recited in claim 10 wherein said mounting means comprises a metal collet in a glass ring for holding said objective lens, said collet being adjustably slidable along the center axis of said ring, and wherein said ring is adjustably slidable in the two dimensions orthogonal to the width of said diode stripe, said objective lens, said collet and said ring together comprising an assembly which is fixed in place with a bonding agent.

12. An imaging system as recited in claim 10 wherein said mounting means allows moving each of said lenses perpendicular to said optical axis.

13. An imaging system as recited in claim 12 wherein said mounting means comprises a pair of folding mirrors having respective surface planes disposed to reflect the optical axis into parallel optical paths so as to position the beam optimally for use in diode pumping applications.

14. An imaging system as recited in claim 13 wherein said mounting means comprises means for moving said pair of folding mirrors in tandem parallel to said parallel optical paths.

15. An imaging system as recited in claim 14 wherein said mounting means comprises means for independently changing the orientation of each said surface plane with respect to the optical lens axis which intersects that mirror.

16. An imaging system as recited in claim 1 and further comprising:
   a laser diode strips having a width of between 5 and 10,000 micrometers aligned in said parallel dimension across said OA for pumping light in said beam having a higher product to said objective lens; and
   a solid-state laser gain element disposed along said optical axis at the overlap between said waists.

17. An imaging system as recited in claim 1 and further comprising a laser diode for pumping said beam, and an optical fiber into an end face of which said beam is imaged.

* * * * *